United States Patent
Bordes et al.

(10) Patent No.: US 9,621,890 B2
(45) Date of Patent: Apr. 11, 2017

(54) METHOD AND DEVICE FOR ENCODING A VIDEO FRAME, METHOD AND DEVICE FOR DECODING A VIDEO FRAME AND STORAGE MEDIUM

(71) Applicant: Thomson Licensing, Issy de Moulineaux (FR)

(72) Inventors: Philippe Bordes, Laille (FR); Pierre Andrivon, Liffre (FR); Philippe Salmon, Saint Sulpice la Foret (FR)

(73) Assignee: THOMSON LICENSING, Issy-les-Moulineaux (FR)

(*) Notice: Subject to any disclaimer, the term of this patent is extended or adjusted under 35 U.S.C. 154(b) by 834 days.

(21) Appl. No.: 13/656,154

(22) Filed: Oct. 19, 2012

(65) Prior Publication Data
US 2013/0287101 A1    Oct. 31, 2013

(30) Foreign Application Priority Data
Oct. 20, 2011    (EP) ..................................... 1136356

(51) Int. Cl.
| | | |
|---|---|---|
| H04N 19/80 | (2014.01) | |
| H04N 19/82 | (2014.01) | |
| H04N 19/85 | (2014.01) | |
| H04N 19/86 | (2014.01) | |
| H04N 19/597 | (2014.01) | |

(52) U.S. Cl.
CPC ..... *H04N 19/00769* (2013.01); *H04N 19/597* (2014.11); *H04N 19/82* (2014.11); *H04N 19/86* (2014.11)

(58) Field of Classification Search
None
See application file for complete search history.

(56) References Cited

U.S. PATENT DOCUMENTS

| | | | | |
|---|---|---|---|---|
| 5,699,079 A | * | 12/1997 | Gossett ..................... G06T 5/20 345/605 |
| 2007/0070084 A1 | * | 3/2007 | Baik et al. .................... 345/605 |

(Continued)

FOREIGN PATENT DOCUMENTS

EP        2169657        3/2008

OTHER PUBLICATIONS

Hoang, Dzung "Unified scaling with adaptive offset for reference frame compression with IBDI", Input Document to JCT-VC, Joint Collaborative Team on Video Coding (JCT-VC) of ITU-T SGI 6 WP3 and ISO/IEC JTC1/SC29/WG11,4th Meeting: Daegu, Korea, (Jan. 20, 2011).*

(Continued)

*Primary Examiner* — William C Vaughn, Jr.
*Assistant Examiner* — Lindsay Uhl
(74) *Attorney, Agent, or Firm* — Brian J. Dorini; Ronald J. Kolczynski

(57) ABSTRACT

A method and a device are described for modifying a video frame for encoding or decoding wherein values of pixels of the video frame are represented an increased bit depth.

The described method comprises using processing means for executing the step of offsetting the pixel values of increased bit depth with offsets, the offsets depending on a spatial neighbourhood of the pixel to-be-offset.

Such local adaptive offsetting of pixel values de-emphasizes high frequencies in the transform domain artificially emphasized by the bit depth increase.

8 Claims, 5 Drawing Sheets

(56) References Cited

U.S. PATENT DOCUMENTS

| | | | |
|---|---|---|---|
| 2009/0097561 A1* | 4/2009 | Chiu et al. | 375/240.16 |
| 2012/0014455 A1* | 1/2012 | Joshi et al. | 375/240.18 |
| 2013/0259118 A1* | 10/2013 | Fu et al. | 375/240.02 |

OTHER PUBLICATIONS

Cheng et al "Bit depth expansion by contour region construction" Circuits and System 2009 IEEE International symposium on IEEE Piscataway NJ-US May 24, 2009 pp. 944 to 947.

Chujoh et al "Video coding technology proposal by Toshiba" 1st JCT VC Meeting Apr. 15-23, 2010 Dresden Joint CollaborativeTeam on Video Coding ISO EC Section 2.7 Figures 1 2.

Hoang D "Unified scaling with adaptive offset for reference frame compression with IBDI" 95th MPEG Meeting Jan. 24-28, 2011 DAEGU Motion Picture Expert group or ISO IEC JTC1 SC29 WG11 No. m18782 Jan. 21, 2011.

Liu et al "Bit depth expansion by adaptive fliter" Circuits and Systems 2008 ISCAS 2008 IEEE international Symposium on IEEE Piscataway NJ USA May 18, 2008 pp. 496-499.

Liu at al "Bit depth scalable coding for high dynamic range video" Proceedings of SPIE, SPIE US vol. 6822 No. 2 Jan. 29, 2008 pp. 682200-1.

European Search Repori dated Jan. 26, 2012.

Chujoh et al. "Internal bit depth increase except frame memory" Video Coding Experts Group (VCEG) 32nd Meeting: San Jose Apr. 20-21, 2007 San Jose, USA.

Wiegand et al. "WD3: Working Draft 3 of High-Efficiency Video Coding" Joint Collaborative Team on Video Coding (JCT-VC) of ITU-T SG16 WP3 and ISO/IEC JTC1/SC29/WG11. 5th Meeting: Mar. 16-23, 2011, Geneva CH.

Pateux et al: "An Excel add-in for computing Bjontegaard metric and its evolution" Video Coding Expert Group (VCEG) 31st Meeting: Marrakech, MA, Jan. 15-16, 2007.

Zhou et al: "Evaluation results on IBDI"Joint Collaborative Team on Video Coding (JCT-VC). 4th Meeting:Daegu, Korea, Jan. 20-28, 2011.

ITU-T H.264 Series H: Audiovisual and Multimedia Systems Infrastructure of audiovisual services—Coding of moving video Advanced video coding for generic audiovisual services H.264, 02/2014.

* cited by examiner

METHOD AND DEVICE FOR ENCODING A VIDEO FRAME, METHOD AND DEVICE FOR DECODING A VIDEO FRAME AND STORAGE MEDIUM

This application claims the benefit, under 35 U.S.C. § 119 of EP Patent Application 11306356.4, filed 20 Oct. 2011.

TECHNICAL FIELD

The invention is made in the field of video frame encoding. More precisely, the invention is concerned with encoding and decoding of video frames using Internal Bit Depth Increase (IBDI).

BACKGROUND OF THE INVENTION

Internal Bit Depth Increase (IBDI) allows extending transforms precision and reference frames buffer precision and can be used for improving codecs' performances significantly.

As exemplarily depicted in FIG. 1, the principle of IBDI is to increase the original bit depth of the original frame samples VID of an InputBitDepth by bitIncrement to an increased bit depth. In the Figure, bold arrows depict flow of data of increased bit depth while normal arrows depict flow of data of original bit depth. IBDI is done prior to transforming and quantizing TQ a residual with respect to a prediction PRED for encoding ENC into a bit stream BS. For prediction, reconstructed reference frames of increased bit depth are used, the reconstructed reference frames resulting from inverse quantization and inverse transformation ITIQ and are subjected to a de-blocking and in-loop filtering FILT before being buffered BUF.

At decoder side, as exemplarily depicted in FIG. 2, an internal bit depth decrease IBDD is applied, after a bit stream BS is received, decoded DEC, inverse quantized and inverse transformed ITIQ, combined with a prediction PRED coming from a buffer BUF and filtered with the de-blocking and in-loop filtering FILT. After bit depth decrease IBDD the video is output. The decoded residuals and the reference frames used for prediction are of said increased bit depth and first a reconstructed frame of said increased bit depth is reconstructed which is then bit depth reduced to regain the frame.

The increase of bit depth can be achieved by left shifting (i.e. adding bitIncrement zeroes on the right of the sample value), for instance.

SUMMARY OF THE INVENTION

The inventors recognized that bit depth increase by, e.g., left shifting actually spreads the non-zero differences between consecutive spatial samples, e.g. a bit shift by one bit doubles a non-zero difference between consecutive samples, which begets fronts and leads to emphasized high frequencies in the transform domain. Thus, coding efficiency may be reduced.

Therefore, it is proposed a method according to claim 1 and a device according to claim 9 for modifying a video frame for encoding or decoding wherein values of pixels of the video frame are represented an increased bit depth. The proposed method comprises using processing means for executing the step of offsetting the pixel values of increased bit depth with offsets, the offsets depending on a spatial neighbourhood of the pixel to-be-offset. The device comprising said processing means for executing the step of offsetting the pixel values.

Such local adaptive offsetting of pixel values de-emphasizes high frequencies in the transform domain of bit depth increased signals.

In an embodiment, the offsets depend on values of neighbouring pixels in the spatial neighbourhoods.

In said embodiment the offsets may depend on numbers of those of the neighbouring pixels which have pixel values larger than the value of the pixel to-be-offset.

In a further embodiment the offsets are no larger than a maximum offset, the maximum offset depending on a number of bits by which bit depth is increased.

It is further proposed a method, as well as a corresponding device, for encoding a video frame wherein values of pixels of the video frame are represented an increased bit depth. Said encoding method comprises modifying the video frame according the proposed method for video frame modification or one of the embodiments thereof.

In an embodiment, the reference video frame used for residual encoding is also modified according the proposed method for video frame modification or one of the embodiments thereof.

It is further proposed a method, as well as a corresponding device, for decoding a video frame wherein values of pixels of the video frame are represented with an increased bit depth, said method comprising modifying a reference video frame according the proposed method for video frame modification or one of the embodiments thereof and reconstructing the video frame using a decoded residual and the modified reference video frame.

A non-transitory storage medium is also proposed, the non-transitory storage medium carrying an encoded video frame, the video frame being encoded according to the proposed method for video frame encoding or the embodiment of this method.

The features of further advantageous embodiments are specified in the dependent claims.

BRIEF DESCRIPTION OF THE DRAWINGS

Exemplary embodiments of the invention are illustrated in the drawings and are explained in more detail in the following description. The exemplary embodiments are explained only for elucidating the invention, but not for limiting the invention's disclosure or scope defined in the claims.

In the figures.

EXEMPLARY EMBODIMENTS OF THE INVENTION

The invention may be realized on any electronic device comprising a processing means correspondingly adapted. For instance, the invention may be realized in a television, a mobile videophone, a personal computer, a digital video camera, a navigation system or a car video system.

Figure 1:
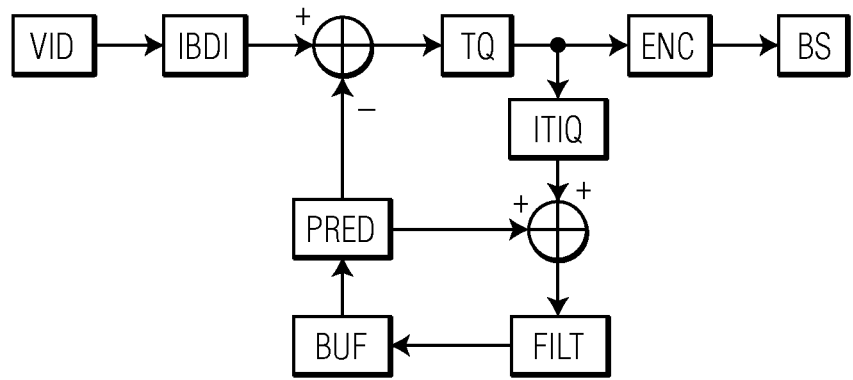
FIG. 1 depicts an exemplary prior art encoder architecture.
Figure 2:
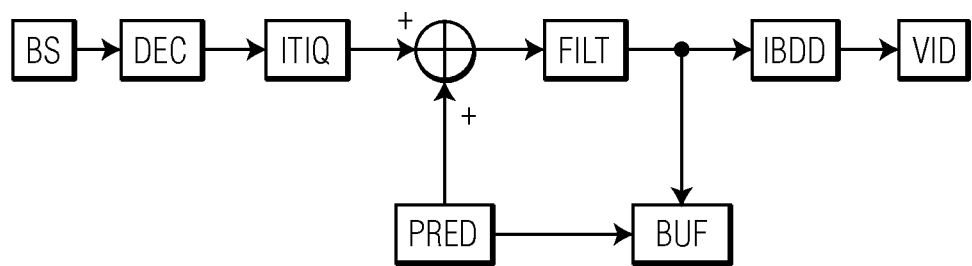
FIG. 2 depicts an exemplary prior art decoder architecture.
Figure 3:
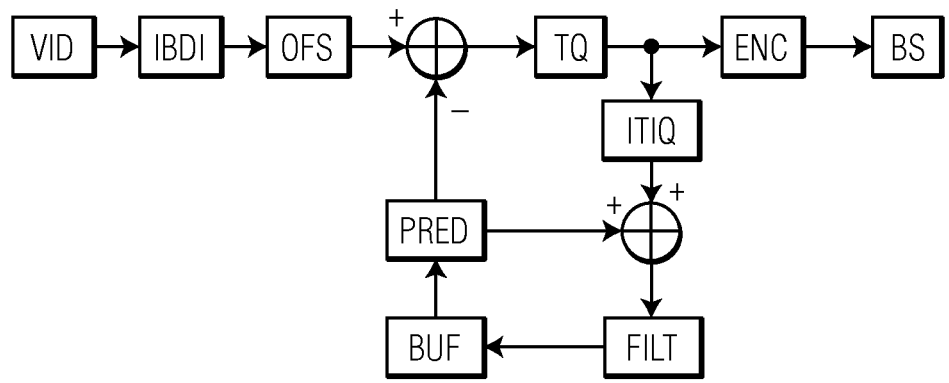
FIG. 3 depicts a first exemplary application of the proposed adaptive offsetting in an encoder.

In a first exemplary embodiment exemplarily depicted in FIG. 3, it is proposed to modify at encoder side the "Bit-Depth-Increase" function with an IBDI post-processing (also called IBDI Filter or adaptive offsetting) in order to reduce the range of the non-zero differences, also called gaps, between adjacent samples in a frame of increased bit depth. This is done by applying the filter IBDI to the video signal of increased bit depth prior to determination of a residual between the video signal of increased bit depth and a prediction PRED thereof.

Advantageously but not necessarily, the adaptive IBDI Filter function has the property that most significant bits remain unchanged wherein the most significant bits of the sample are the bits prior to IBDI.

Many filter designs are possible. In an exemplary embodiment, the IBDI Filter is a non-linear low pass filter adding an offset which depends on values of adjacently neighboring samples. The offset value is in the range $[0; (2^{bitIncrement}-1)]$ wherein bitIncrement is the difference between the original bit depth and the increased bit depth. An example of such non-linear low pass filter adding an offset is the following offset function:

$$\text{Offset}(x_{cur}) = \text{Min}\{(\alpha * 2^{bitIncrement}; (2^{bitIncrement}-1)\}$$

wherein $x_{cur}$ denotes the position of a given pixel in the frame, $N(x_{cur})$ denotes the set of pixel positions in the neighborhood of $X_{cur}$ without $x_{cur}$.

$Nb(x_{cur})$ denotes the number of pixel in the neighborhood $N(x_{cur})$ ($Nb(x_{cur})$-connexity), $Nb(x_{cur})=\#(\{N(x_{cur})\})$ $C(x)$ denotes the original component sample value before "Bit-Depth-Increase" at the position x in the frame, $Cpt(x_{cur})$ denotes the number of pixels in the neighborhood of $x_{cur}$ with component value greater than the component value of $x_{cur}$:

$$Cpt(x_{cur}) = \#(\{x_n \in N(x_{cur})/C(x_n) > C(x_{cur})\})$$

and $$\alpha = Cpt(x_{cur})/Nb(x_{cur})$$

Figure 4:
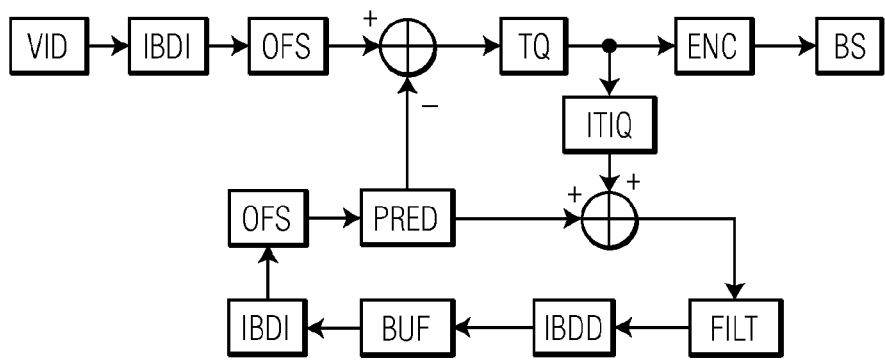
FIG. 4 depicts a second exemplary application of the proposed adaptive offsetting in an encoder.

Advantageously but not necessarily, the IBDI filter process is also applied to pixel values of reference video frames used for inter prediction also known as temporal prediction. This is exemplarily depicted in FIG. 4 and FIG. 10. In a multi view coding context, the IBDI filter process can also be applied to pixel values of reference video frames of a different view wherein the reference video frames are used for inter-view prediction.

Inter prediction and inter-view prediction makes use of reconstructed reference frames stored in a reference frame buffer BUF.

Figure 5:
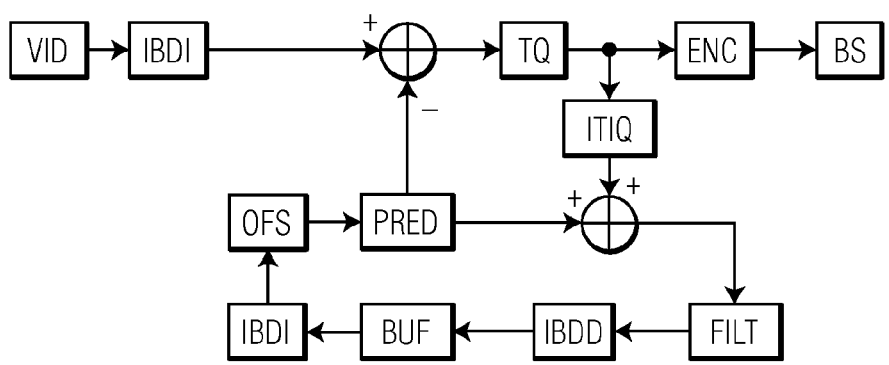
FIG. 5 depicts a third exemplary application of the proposed adaptive offsetting in an encoder.
Figure 8:
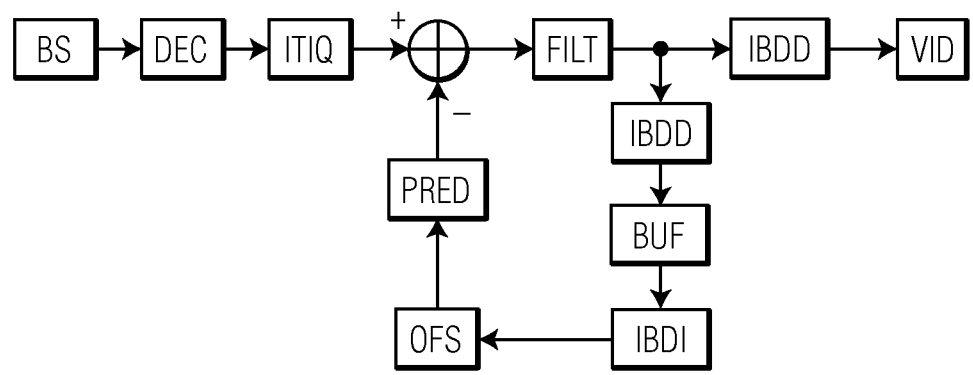
FIG. 8 depicts a first exemplary application of the proposed adaptive offsetting in a decoder.

The reconstructed reference frames can be stored with original bit depth or with a bit depth larger than the original bit depth but smaller than the increased bit depth, in order to save storage capacity. In this case, reconstructed reference frames retrieved from the buffer can be bit depth increased IBDI and filtered FILT before using them for prediction PRED, at encoder side as exemplarily depicted in FIG. 4 and FIG. 5, and at decoder side, as exemplarily depicted in FIG. 8.

Figure 6:
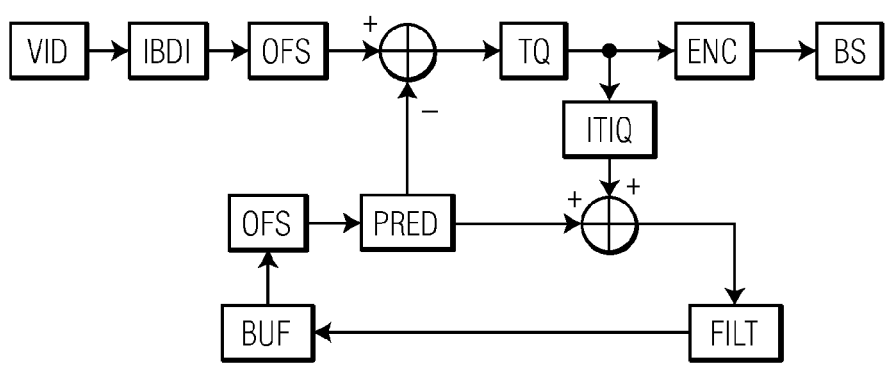
FIG. 6 depicts a fourth exemplary application of the proposed adaptive offsetting in an encoder.
Figure 7:
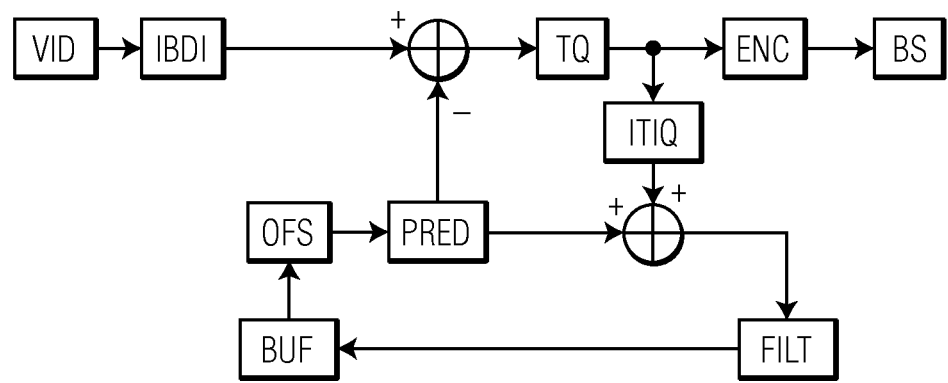
FIG. 7 depicts a fithfth exemplary application of the proposed adaptive offsetting in an encoder.
Figure 9:
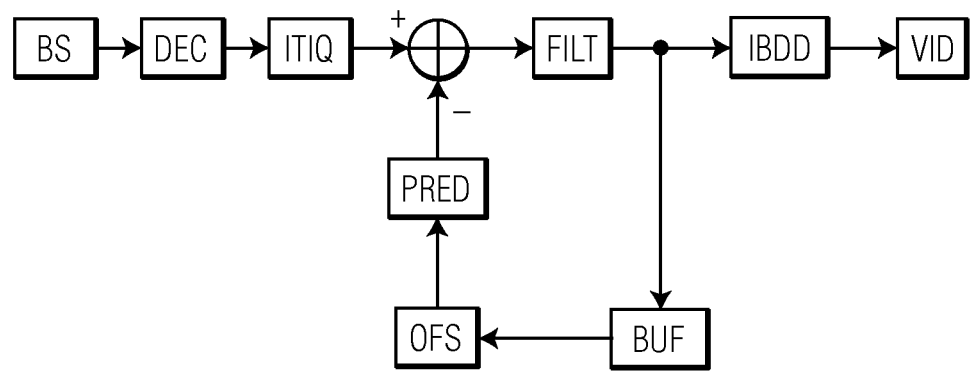
FIG. 9 depicts a second exemplary application of the proposed adaptive offsetting in a decoder.

The reconstructed reference frames can be stored with increased bit depth wherein the offset is either maintained, or, for better compression, amended or removed. In this case of storage with increased bit depth, reconstructed reference frames retrieved from the buffer can be filtered before using them for prediction, at encoder side as exemplarily depicted in FIG. 6 and FIG. 7, and at decoder side, as exemplarily depicted in FIG. 9.

Tests of this invention on various video encoders and decoders show that for a given quality level (PSNR) the bit stream size can be reduced significantly, in particular for devices using increased bit depth according to high efficient video codec (HEVC) and/or according to key technology areas (KTA) reference software codec.

Figure 10C:
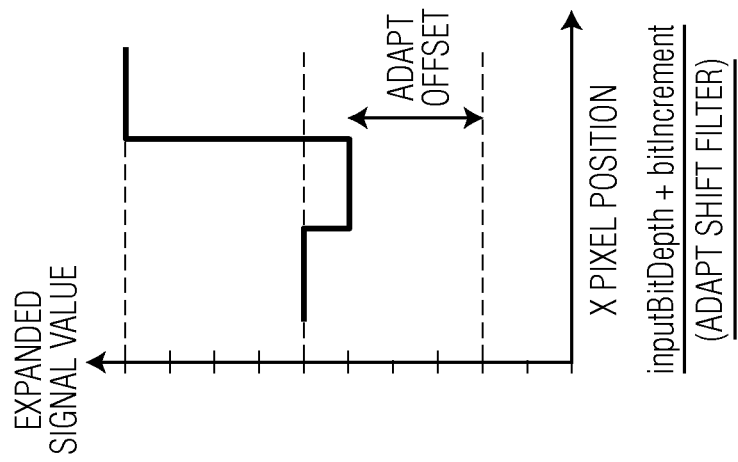
FIG. 10a depicts an exemplarily original signal value.
FIG. 10b depicts the spreading of the exemplarily signal values due to increasing the bit depth, FIG. 10c exemplarily depicts reduction of said spreading due to the proposed adaptive offsetting.
Figure 10B:
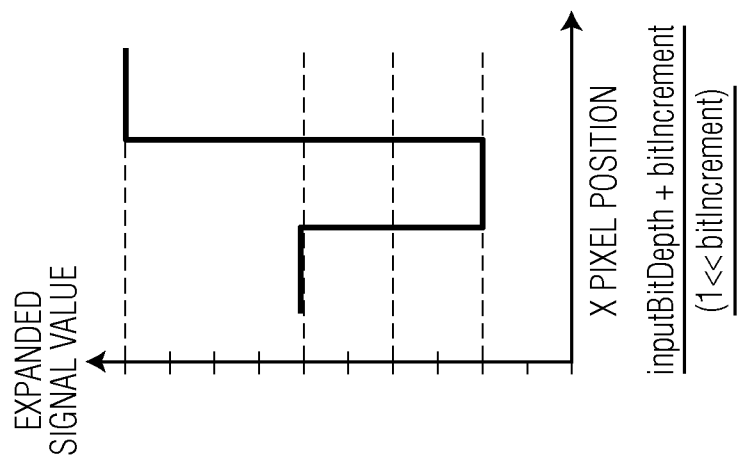
Figure 10A:
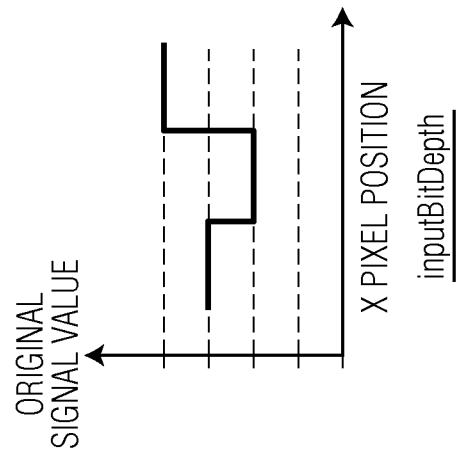

The principle of adaptive filtering is exemplarily depicted in FIG. 10 wherein FIG. 10a depicts an exemplarily original signal value, FIG. 10b depicts the spreading of the exemplarily signal values due to increasing the bit depth and FIG. 10c exemplarily depicts reduction of said spreading due to the proposed adaptive offsetting.

Figure 11A:
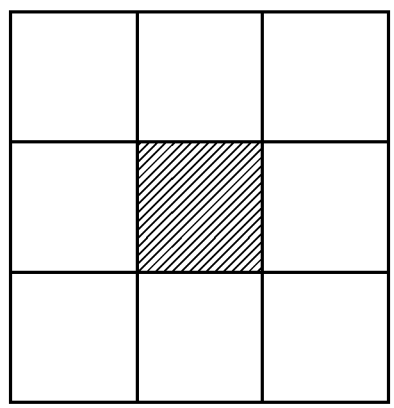
FIG. 11a depicts a neighbourhood consisting of the eight pixels directly adjacent to the pixel to-be-filtered which is depicted in grey.
Figure 11B:
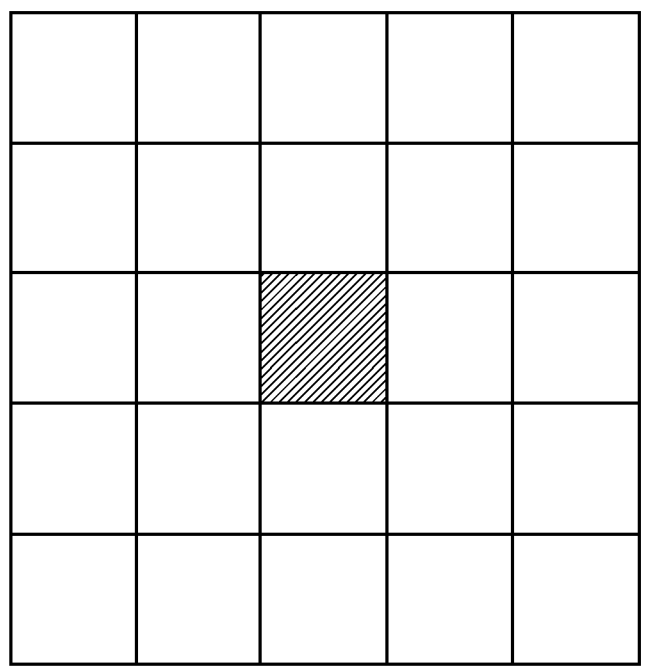
FIG. 11b depicts a larger neighbourhood further comprising all pixels adjacent to the pixels of the neighbourhood depicted in FIG. 11a, with exception of the pixel to-be-filtered.

FIG. 11 gives to examples of neighbourhoods. FIG. 11a depicts a neighbourhood consisting of the eight pixels directly adjacent to the pixel to-be-filtered which is depicted in grey; FIG. 11b depicts a larger neighbourhood further comprising all pixels adjacent to the pixels of the neighbourhood depicted in FIG. 11a, with exception of the pixel to-be-filtered.

The invention claimed is:

1. A method for modifying a video frame, the method comprising:

increasing the values of pixels of the video frame in bit depth; and offsetting the pixel values of increased bit depth with offsets, wherein the offsets depend on a spatial neighborhood consisting of pixels directly adjacent to the pixel to-be-offset, and wherein each offset is calculated as the ratio of the number of those of the neighboring pixels which have pixel values larger than the value of the pixel to-be-offset over the total number of neighboring pixels.

2. The method of claim 1, wherein the offsets are no larger than a maximum offset, the maximum offset depending on a number of bits by which bit depth is increased.

3. The method of claim 1, further comprising determining a residual between the modified video frame and a reference video frame.

4. The method of claim 1, further comprising reconstructing the video frame using a decoded residual and the modified reference video frame.

5. A device for modifying a video frame, the device comprises a processor configured to:

increase the values of pixels of the video frame in bit depth; and offset the pixel values of increased bit depth with offsets, wherein the offsets depend on a spatial neighborhood consisting of pixels directly adjacent to the pixel to-be-offset, and wherein each offset is calculated as the ratio of the number of those of the neighboring pixels which have pixel values larger than the value of the pixel to-be-offset over the total number of neighboring pixels.

6. The device of claim 5, wherein the offsets are no larger than a maximum offset, the maximum offset depending on a number of bits by which bit depth is increased.

7. The device of further 5, further comprising determining a residual between the modified video frame and a reference video frame.

8. The device of claim 5, further comprising reconstructing the video frame using a decoded residual and the modified reference video frame.

* * * * *